April 14, 1964 R. G. POHL 3,129,338

UNI-JUNCTION COAXIAL TRANSISTOR AND CIRCUITRY THEREFOR

Filed Jan. 30, 1957 4 Sheets-Sheet 1

Legend:
----→ Majority Carriers
——→ Minority Carriers

Inventor
Robert G. Pohl
by John J. Pedersen
Attorney

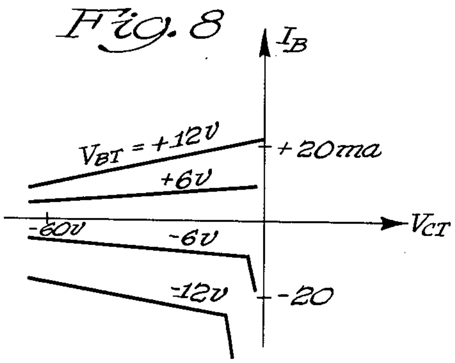
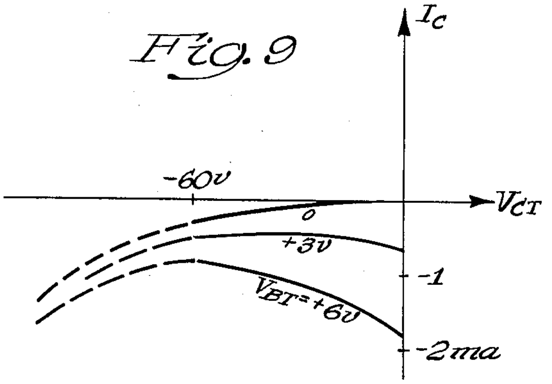
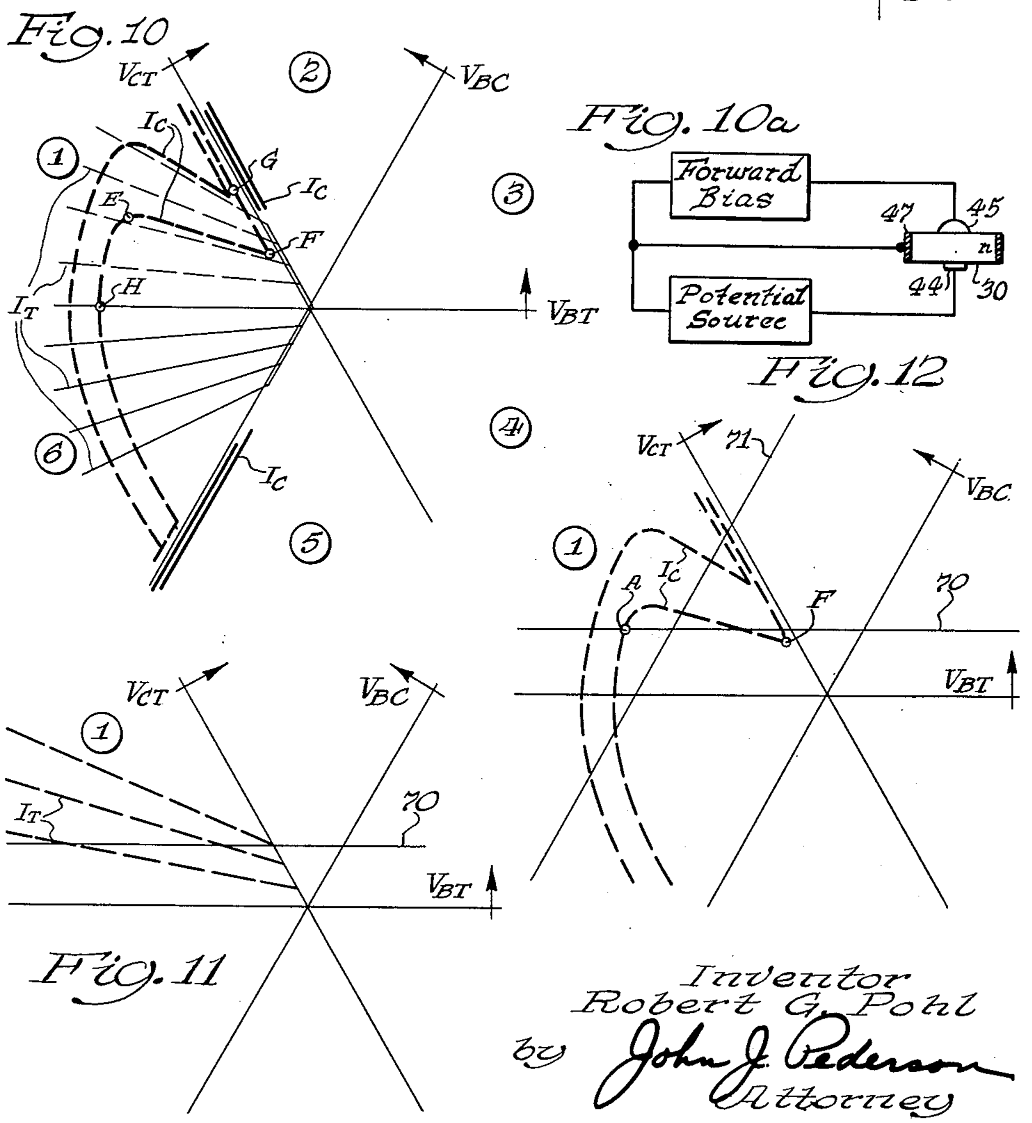
Fig. 10, Fig. 10a, Fig. 11, Fig. 12
Inventor
Robert G. Pohl
by John J. Pederson
Attorney

UNI-JUNCTION COAXIAL TRANSISTOR AND CIRCUITRY THEREFOR

Filed Jan. 30, 1957

Inventor
Robert G. Pohl
by John J. Pederson
Attorney

April 14, 1964 R. G. POHL 3,129,338

UNI-JUNCTION COAXIAL TRANSISTOR AND CIRCUITRY THEREFOR

Filed Jan. 30, 1957

4 Sheets-Sheet 4

Inventor
Robert G. Pohl
by John J. Pederson
Attorney 3,129,338

UNI-JUNCTION COAXIAL TRANSISTOR AND CIRCUITRY THEREFOR

Robert G. Pohl, Chicago, Ill., assignor to The Rauland Corporation, a corporation of Illinois Filed Jan. 30, 1957, Ser. No. 637,150
19 Claims. (Cl. 307—88.5)

The present invention relates to semi-conductor apparatus.

With the advent of the transistor, investigation in the field of semi-conductors was tremendously increased toward the end of devising numerous different varieties of semi-conductor structures for use in many different types of circuits. Among the devices which have heretofore been developed are several which in operation display a negative resistance between a pair of electrodes at some portion of their operating ranges. One such prior known negative resistance device is briefly described in an article entitled "Double Base Expands Diode Applications," by J. J. Suran, which appeared at page 198 of the March 1955 issue of Electronics. This device was described as including a bar of semi-conductive material having ohmic contacts at both ends and a region on one surface of the bar intermediate the ends forming a diode contact with the bar. In operation, a potential is applied between the two ohmic contacts and the intermediate region is forward biased to a potential equal to a potential in the bar itself due to the voltage gradient through the bar. Under these operating conditions, a negative resistance is observed between the forward-biased intermediate region and one of the ohmic contacts.

Another device said to display a negative resistance characteristic is described in an article entitled "Unipolar Field Effect Transistor," by G. C. Dacey and I. M. Ross, which appeared in the Proceedings of the Institute of Radio Engineers for August 1953, pages 970–979. In that device, a current flowing between two ohmic contacts affixed to opposite ends of a bar of n-type semi-conductor material is modulated by a voltage applied to a pair of p-type gate electrodes affixed on opposite sides of an intermediate portion of the bar. The mechanism of operation is attributed to a pinching-off of the main current upon application of a reverse bias to the gate electrodes. Moreover, the article states that during the pinch-off action, a negative resistance is observed in the gate electrode; this is attributed to a minority-carrier current out of the bar and into the gate electrodes. It is further suggested that the ohmic contact which serves as the drain for the main electron current might be constituted of p-type material so as to increase the hole current flowing to the gate, thereby obtaining a more pronounced negative resistance.

Certain modified structures operating generally on the same principle have from time to time been suggested in order to seek improvement of various operating characteristics. One approach has been to form the body of the device in the shape of a U, presumably in an attempt to improve the efficiency of the pinching action of the gate electrode. While some improvements have been made in this general type of device, one or more objectionable difficulties have been encountered with all such prior known structures. In general, the geometry of the prior devices has been such as to inefficiently utilize the usually expensive semi-conductor materials. In addition, excessively large voltages and/or gating areas have been required in order to achieve sufficient control of the operation of such devices. Furthermore, these prior art devices have in general been peculiar in shape and electrode orientation so as to require special materials and production apparatus distinct from that normally used in the manufacture of more conventional semi-conductor devices such as diodes and transistors.

It is accordingly a general object of the present invention to provide a semi-conductor device which presents a negative resistance at one of its input terminals and yet which overcomes objectionable difficulties noted above.

It is another object of the present invention to provide a novel semi-conductor device of the above character which is capable of effectively utilizing in its operation substantially all of the semi-conductive material of which it is constructed.

A further object of the present invention is to provide a semi-conductive device of the above character which may be easily and inexpensively manufactured with equipment conventionally employed in the manufacture of conventional transistors.

It is a more specific object to provide a negative-resistance semi-conductor device which may be manufactured with the same apparatus utilized in the production of alloy-junction transistors, without the need for any additional jigs or other fixtures.

Still another object of the present invention is to provide a new and improved negative-resistance semi-conductor device which is capable of being housed in a minimum of space and in containers heretofore available for compactly housing conventional semi-conductor devices.

It is also an object of the present invention to provide a negative-resistance semi-conductor device in which complete control is afforded by a single control semi-conductor junction affixed to a conventional wafer of semi-conductive material.

A still further object of the present invention is to provide an improved semi-conductor apparatus in which a negative resistance exists between a pair of terminals presenting to external circuitry a lower impedance, regardless of polarity, than heretofore possible.

Another object of the present invention is to provide an electrode structure for a semi-conductor device which facilitates manufacture of the device, which insures accurate location of an alloy junction and which insures an excellent electrical contact between the junction area and a connecting lead member.

Another detailed object of the present invention is to provide a new and improved base electrode structure for a semi-conductor device which is simple and economical to manufacture, which affords excellent electrical connection to the body of semi-conductive material employed in the device, and which affords maximum mechanical support for the semi-conductive body.

The device of the present invention includes a body of semi-conductive material of predetermined conductivity type. Means, including a region forming a diode contact with a first body surface portion, are provided for developing upon the application thereto of a predetermined potential, a depletion region effectively terminating in a body surface portion of predetermined area and opposite the diode contact region. A first electrode is in ohmic contact with the body only within the portion of predetermined area, while a second electrode is in electrical contact with the body but only within a third surface portion spaced from the diode-contact region and from the portion of predetermined area.

In accordance with a further feature of the present invention, means coupled in series with the diode contact are provided for establishing a negative resistance characteristic between the first and second electrodes. Such means may include a constant-current source which biases the diode contact with respect to the first and second electrodes; alternatively, with the diode contact biased in the reverse direction with respect to the first and second electrodes, an impedance of predetermined magnitude, coupled in series with the diode contact, is sufficient to establish a negative resistance between the first and second electrodes.

In accordance with a further feature of the present invention, an electrode for a semi-conductor device including a body of semi-conductor material comprises a mass of conductive material forming an electrical and mechanical junction with a surface on the body; a conductive wire of predetermined length and terminating with a substantially closed loop, lying in a plane transverse to the wire and substantially parallel to the body surface, is disposed within the mass of conductive material.

Another feature of the present invention is directed to a base electrode for a semi-conductor device which comprises a generally U-shaped member including a closed end portion from which project a pair of leg portions, at least one of which is of conductive material, which individually have respective first and second substantially coaxial apertures of predetermined area, and which define a space of substantially constant predetermined width.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like numerals identify like elements, and in which:

Figure 1:
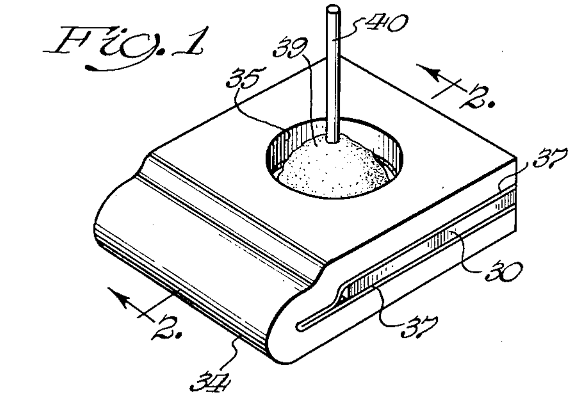
FIGURE 1 is a perspective view of a semi-conductor device constructed in accordance with the present invention.
Figures 2A, 2B:
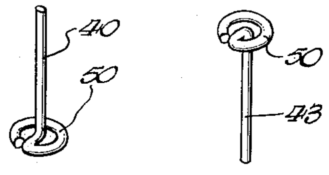
FIGURE 2 is an enlarged cross-sectional view taken along line 2—2 of FIGURE 1.
Figure 3:
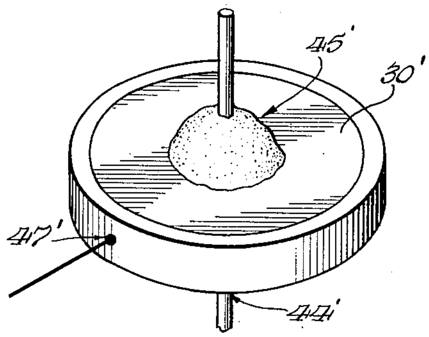
Figure 2:
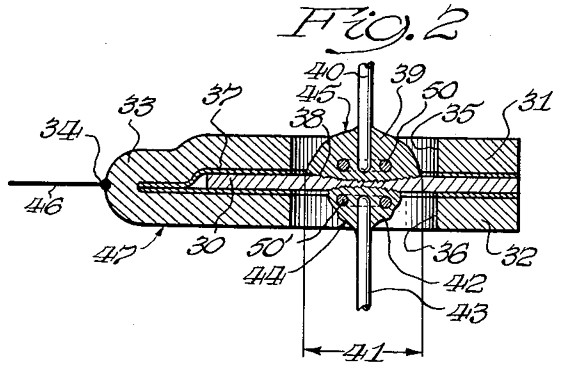
Figure 13:
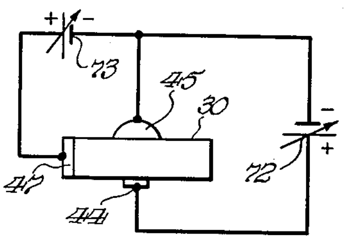
Figures 13A, 14:
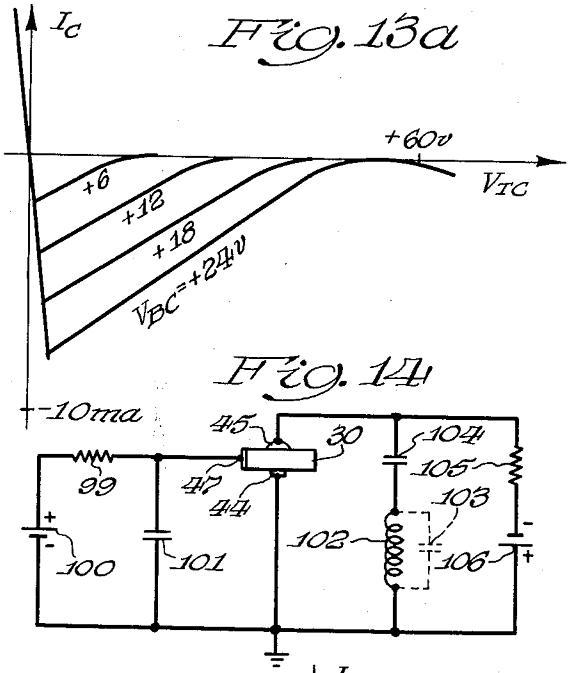

FIGURES 2*a* and 2*b* are perspective views of electrode elements of the device of FIGURES 1 and 2;

FIGURE 3 is a perspective view of an alternative embodiment of the present invention;

FIGURES 4, 5, 6, 7 and 10*a* are schematic circuit diagrams useful in explaining the operation of the devices shown in FIGURES 1 and 3;

FIGURES 8, 9, 10, 11 and 12 are graphical representations useful in explaining the operation of the inventive structure;

FIGURES 13 and 13*a* are a schematic circuit diagram and a set of curves relating thereto, respectively, which afford additional insight into the operation of the inventive structure;

FIGURE 14 is a schematic circuit diagram of a conventional type of resonant oscillator, typifying the manner in which the devices of the present invention may be utilized in conventional transistor circuits.

Figure 15:
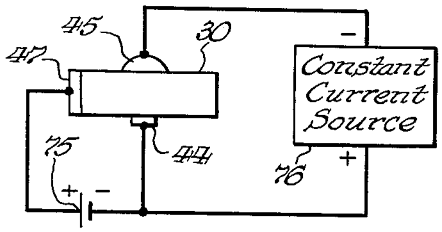
Figure 16:
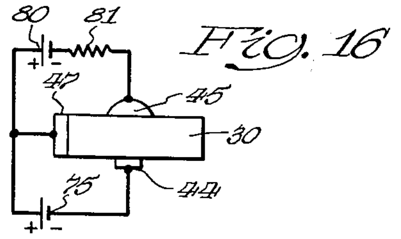
Figure 15A:
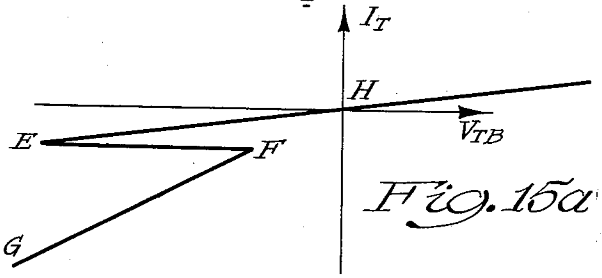
Figures 17, 17A, 17B:
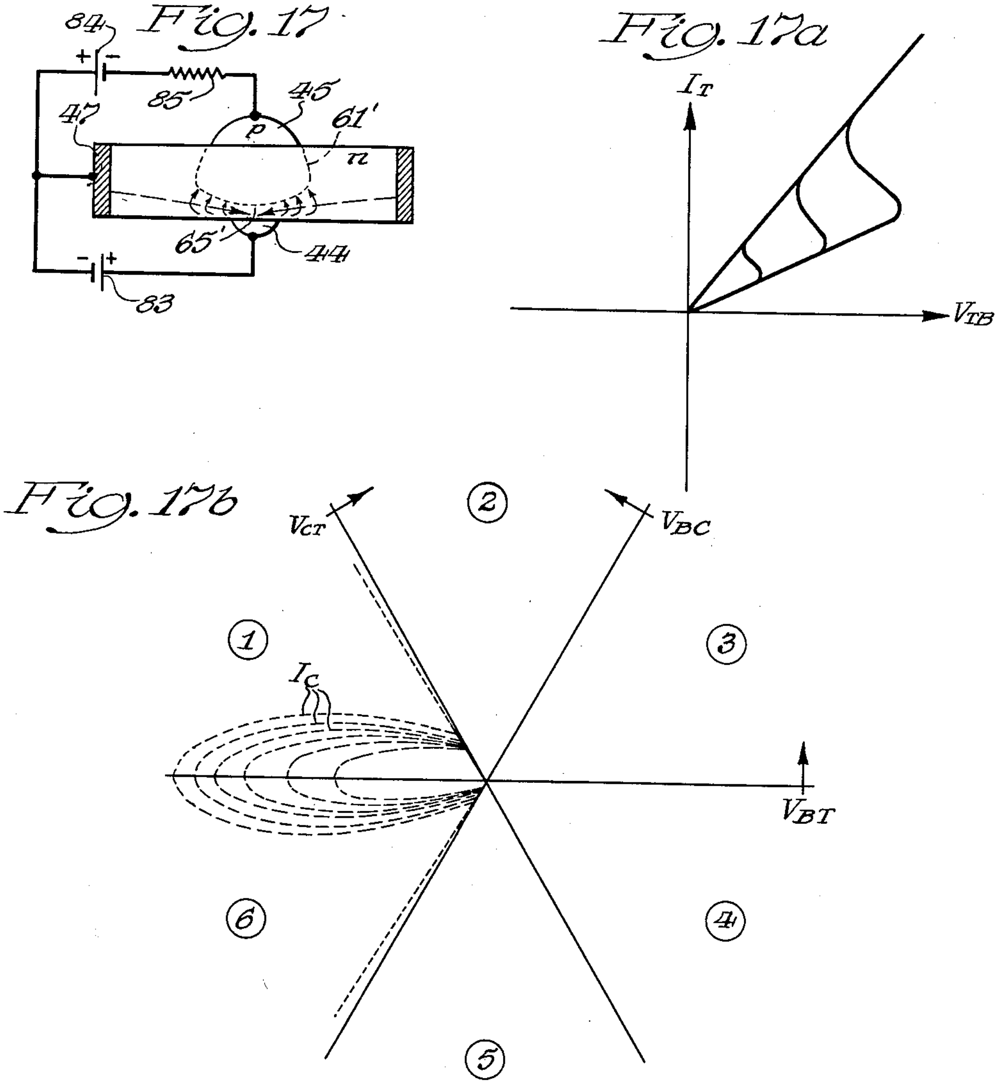
Figure 19:
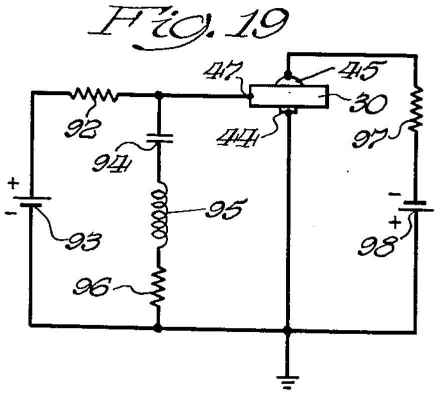
Figure 18:
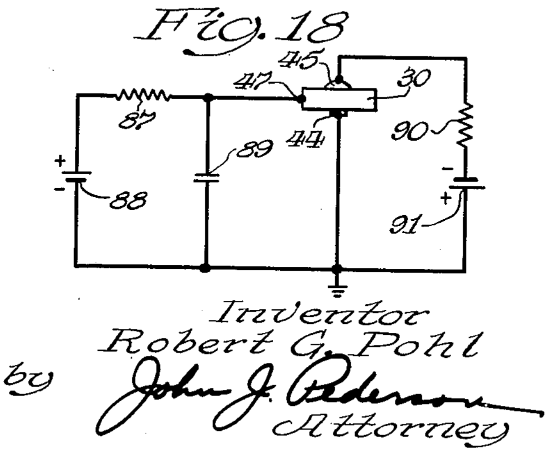

FIGURE 15 is a schematic circuit diagram of semi-conductor apparatus embodying the present invention;

FIGURE 15*a* is a graphical representation useful in explaining the operation of the apparatus of FIGURE 15;

FIGURES 16 and 17 are schematic circuit diagrams of further semi-conductor apparatus embodying the invention;

FIGURES 16*a* and 16*b*, and FIGURES 17*a* and 17*b*, are graphical representations of operating characteristics of the apparatus shown in FIGURES 16 and 17, respectively;

FIGURE 18 is a schematic circuit diagram of a saw-tooth oscillator or pulse generator embodying the invention; and FIGURE 19 is a schematic circuit diagram of a resonant oscillator constructed in accordance with the invention.

In the typical embodiment of the present invention shown in FIGURES 1 and 2, a wafer 30 of semi-conductor material such as germanium or silicon of predetermined conductivity type (e.g., n-type, p-type, or intrinsic) is sandwiched between two legs 31 and 32 which project from the closed end portion or bight 33 of a generally U-shaped conductive base member or tab 34. Legs 31 and 32 are disposed in substantially parallel planes to define a space therebetween of substantially constant width. Coaxially disposed in legs 31 and 32 are respective transverse apertures 35 and 36, preferably circular and of equal size. The inner surfaces of legs 31 and 32 are preferably covered with a coating 37 of tin or the like which, during manufacture of the device, is melted to solder wafer 30 to base 34 and thereby insure good electrical and mechanical contact.

Centrally disposed coaxially within aperture 35 and electrically and mechanically joined to the surface of wafer 30 at junction 38 is a mass of barrier-forming material 39. Material 39 includes impurities establishing a region of a different conductivity to that of wafer 30 and therefore forms a diode contact with the latter. While any known method may be employed to form junction 38, it preferably is an alloy junction and may be prepared in accordance with the method described and claimed in the copending application of Robert G. Pohl entitled "Method of Preparing Semi-Conductor Junctions," Serial No. 576,409, filed April 5, 1956. During formation of junction 38, coating 37 is also melted to form a solder joint between base 34 and wafer 30. Protruding outwardly from material 39 is a contact lead 40 to which electrical connections are made when the device is placed in use.

Disposed within the other aperture 36 is a body of material 42 electrically joined to wafer 30, preferably by the formation of an alloy junction therewith, to form a substantially ohmic non-rectifying contact with the wafer. Protruding outwardly from material 42 is a lead 43 to which suitable electrical connections are made when the device is placed in use. Thus, this ohmic contact comprising material 42 is disposed on a surface of wafer 30 opposite the diode contact. Moreover, the area of contact between material 42 and wafer 30 is entirely within the umbra of junction 38 and preferably within a zone of orthogonal projection of junction 38 through wafer 30 as indicated by numeral 41, while base member 34 is in ohmic contact with wafer 30 only at surface portions thereof external of zone 41 and spaced from the surface areas bounded thereby. Preferably, ohmic contact 42 is centrally positioned within aperture 36 in coaxial alignment with rectifying junction 38 and is smaller than the diode contact of junction 38.

In order to simplify the remaining description, certain nomenclature has been adopted. Material 42 and its connecting lead 43 constitute a target electrode 44 in ohmic contact with the semi-conductive body or wafer 30. Material 39 and lead 40 constitute a collector electrode 45 which forms a diode contact with semi-conductive body 30. Finally, base member 34 together with a lead 46 electrically and mechanically joined thereto, by a spot weld for example, constitute a base electrode 47.

The usual methods of forming alloy-junctions include the placing of a pellet of one conductivity-type material upon the surface of the other material and then subjecting the pellet to localized heat of a temperature sufficient to form the junction; in the above-mentioned copending application, an improved junction is formed by following certain procedures set forth in detail therein. During or before formation of the junction, a wire lead is disposed within the mass of the pellet primarily for the purpose of providing a convenient electrical connection to the finished device and to enable ultrasonic agitation of the liquid alloying solution during the heat cycle. It has been found that, during the alloying process, the pellet material tends to wet the surface of the wafer whereupon it is likely to move to one side or the other of the spot on the wafer surface upon which it is placed; this makes accurate centering and alignment of the junction very difficult.

The presence of the usual connecting lead inserted within the pellet material is of aid in reducing lateral displacement between pellet and wafer, but there still exists a sufficient likelihood of movement of the pellet to create major inconsistencies in the characteristics of the finished products. This problem is avoided, in accordance with one feature of the invention, by utilizing for leads 40 and 43 a structure such as that illustrated respectively in FIGURES 2*a* and 2*b*; leads 40 and 43 terminate respectively with substantially closed loops 50 and 50′, each of which lies in a plane transverse to the wire and is placed within the pellet material with the plane of the loop substantially parallel with the surface of wafer 30. Conveniently, the pellet of material 39 or 42 is of a diameter slightly larger than the loop and is first melted onto the loop to which it clings by virtue of surface tension forces. The loop together with the material thereon is then placed accurately into position adjacent the surface of wafer 30 whereupon the alloying procedure is carried out. During the alloying operation, the greatly increased surface area of the loop in contact with the pellet material, over that available when the straight end of the wire is merely inserted into the pellet material in accordance with conventional practice, holds the melted pellet material accurately in position during the entire operation. Also, the increased contact area between the loop and the pellet material aids in obtaining excellent electrical contact between the lead and the junction-forming material.

FIGURE 3 illustrates an alternative structure in which wafer 30′ is cylindrical in shape. Base electrode 47′ comprises a conductive ring of nickel or the like encircling the circumference of wafer 30′ in ohmic contact therewith. Collector electrode 45′ and target electrode 44′ are formed centrally on opposite sides of wafer 30′ in the same manner as collector 45 and target 44 in the device of FIGURES 1 and 2. Electrically, the device shown in FIGURE 3 is substantially interchangeable with that shown in FIGURE 2, for it will be observed that the unique base tab 34 of FIGURE 2, having at least one of legs 35 and 36 of conductive material, forms a ring of conductive material effectively surrounding the collector and target electrodes in surface contact with semi-conductive wafer 30; in either case, a preponderance of the currents flowing between the target and collector electrodes, on the one hand, and the base electrode on the other will terminate in the most proximate portion of the latter.

Before proceeding with a description of the operation of the device, it may be helpful to set forth, merely by means of illustration and in no sense by way of limitation, the detailed parameters and specifications of a device constructed in the form shown in FIGURES 1 and 2 and from which certain of the hereinafter described curves and other exemplary features of the operation were taken. In this typical device, wafer 30 was of n-type, 12 ohm-centimeter germanium, 0.075 inch square and 0.0025 inch thick. Base tab 34 was formed from a sheet of nickel, .01 inch thick, bent generally into the shape of a U to define a space between legs 31 and 32 approximately 0.003 inch wide to receive wafer 30, the inner surfaces of legs 31 and 32 being precoated with a layer 37 of tin 0.0005 inch thick. It will be noted that wafer 30 is snugly received within the legs of base tab 34 and, after tin coating 37 solders the wafer to the legs, a very good electrical contact is formed, while at the same time the base tab forms a rugged mechanical support for the wafer. Apertures 35 and 36 were centrally disposed in each leg and were each 0.045 inch in diameter. The finished base tab was 0.075 inch in width and 0.105 inch in length.

Collector electrode 45 was formed from a pellet 0.014 inch in diameter and 0.015 inch thick composed of substantially 99.5% indium and 0.5% gallium, the percentages being specified by weight. Lead 40 was formed from a length of 0.002 inch stainless steel wire with loop 50 being 0.012 inch in diameter.

Target electrode 44 was formed from a pellet 0.012 inch in diameter and 0.003 inch thick composed of substantially 95% tin and 5% antimony by weight. Loop 50′ in lead wire 43 again was 0.012 inch in diameter.

Devices embodying the invention have also been constructed utilizing an intrinsic semi-conductor material for wafer 30; a typical such device included a wafer of germanium having a conductivity of approximately 40 ohm-centimeters, while the other specifications remained the same as in the specific embodiment described just above. These devices also functioned in a manner like that to be described below for the presently embodied device; the essential condition is that junction 38 be rectifying and this condition may be satisfied in any of a variety of well-known manners. The term "diode contact" is therefore used in the present specification and claims to define any such rectifying junction.

Figure 4:
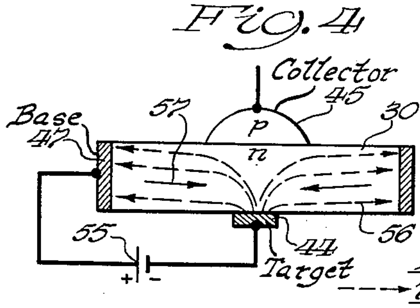

The operation of the device may best be understood with reference first to FIGURE 4 which schematically illustrates the device of FIGURES 1 and 2 or FIGURE 3 and includes wafer 30, target 44, collector 45 and base 47. A voltage source such as a battery 55 is connected between target 44 and base 47 to bias the target negatively with respect to the base, while collector 45 is left unconnected. In the present example, wafer 30 is of n-type material while collector electrode 45 is of p-type material. Thus, the majority carriers in the wafer are electrons, while the minority carriers therein are holes. It will be understood that the description to follow is equally applicable to the reverse situation where wafer 30 is of p-type material and collector electrode 45 is of n-type material, whereupon the majority carriers are holes and the minority carriers are electrons; with this arrangement, the voltage source polarities shown in FIGURE 4 and the succeeding figures would necessarily be reversed.

In FIGURE 4, the current flow within wafer 30 in response to the difference of potential between base 47 and target 44 consists mainly of majority-carrier current which, with the n-type wafer shown, is an electron current. However, there is also a minority-carrier current which in this instance constitutes a hole current. The majority-carrier current flows from target 44 through the wafer to base 47, while the minority-carrier current flows in the reverse direction; thus, the electron current in wafer 30 is indicated by dash lines 56 directed toward base 47, while hole current is represented by solid lines 57 directed toward target 44. The hole current 57 is of lesser magnitude than but proportional to the electron current 56.

Figure 5:
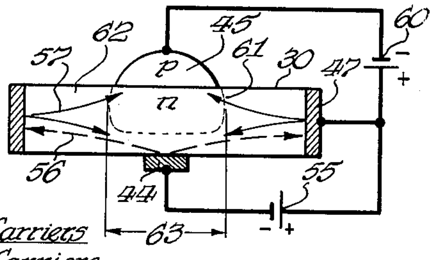

The circuit of FIGURE 5 is identical with that of FIGURE 4 except that an additional voltage source is included to bias collector 45 in a reverse direction (i.e., in a direction opposing majority-carrier current flow) with respect to target 44 and base 47; this is achieved by connecting between collector 45 and base 47 a voltage source such as a battery 60 which is of greater potential than that of voltage source 55, the negative terminal of battery 60 being connected to collector 45. When such a reverse bias is applied to the collector, a region is created in wafer 30 in the vicinity of the collector junction where very few carriers are present; the minority carriers are very strongly attracted toward the collector, while the electrons are repelled from it. This region, called the depletion region and indicated by dashed line 61, projects farther into the wafer with increasing reverse collector voltage, and as it does so, the volume in the wafer external to region 61, which supports base-to-target current flow, becomes smaller; thus, with constant base-to-target voltage, the base-to-target current decreases with increasing reverse collector potential. This phenomenon is known as "pinching." In the present device, a continued increase in the reverse collector potential results in a progressively increasing penetration of the depletion region through wafer 30, until finally the target-to-base current is substantially pinched-off; at this point, the depletion region effectively terminates in a surface portion of predetermined area, indicated by numeral 63, surrounding target 44 on the surface opposite collector 47. As applied to FIGURE 2, area 63 lies entirely within aperture 36.

In addition to electron current 56 between the base and target, there is also hole current 57 in the opposite direction, at least a portion of which is attracted to collector 45. As already stated, this hole current flowing into the collector is proportional to the amount of base-to-target current. By reason of the proportionality of this minority-carrier collector current to the base-target current and the pinching action of the depletion region, an increase in reverse collector voltage causes a decrease in base-to-target current and consequently a decrease in the collector current, whereupon a negative resistance appears at the collector electrode; that is to say, a negative resistance is presented to a circuit connected between the collector and either of the other two electrodes.

Figure 6:
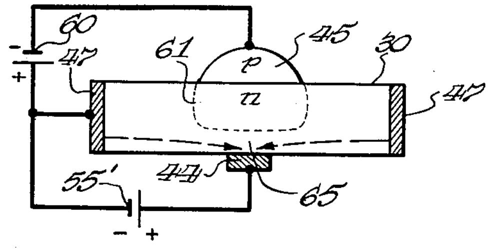

If the base-to-target potential is reversed in polarity, as indicated by source 55' in FIGURE 6, the minority-carrier collector current becomes much smaller and may substantially disappear in the device described with respect to FIGURES 1 and 2. This may be for the reason that region 65, in the vicinity of target 44 beneath depletion region 61 and at least during the occasion of substantial pinching action by the latter, constitutes an insufficient volume of semi-conductive material external to but immediately adjacent depletion region 61 to provide a sufficient number of minority carriers to support more than a very small amount of minority-carrier current flow sufficiently near the collector to be drawn to the latter rather than to the base.

It appears that in order to produce a negative resistance at collector 45, the semi-conductor body, wafer 30, must contain a reservoir of minority carriers. This reservoir, as indicated in FIGURE 5, constitutes region 62 in wafer 30 along the current path between base electrode 47 and target 44, depletion region 61 extending into the current path on the side thereof toward target 44 from region 62.

Now that the general current-flow patterns have been established, it is evident that the device of the present invention, as shown in FIGURES 1 and 2, is symmetrical; that is, current flow between target 44 and base 47 extends 360° around the target, while the depletion region 61 produced by collector 45 overlies target 44 and uniformly controls the base-to-target current in all directions. With this arrangement, collector 45 is capable of asserting a sharply controllable influence over the base-to-target current while substantially the entire area of wafer 30 beneath the depletion region may be utilized for current conduction. At the same time, the volume of wafer 30 external to the depletion region need only be sufficiently large to support a minority-carrier collector current of a magnitude which will create a negative resistance at the collector; more will be said below concerning the minimum required volume of the minority-carrier reservoir 62.

Figure 7:
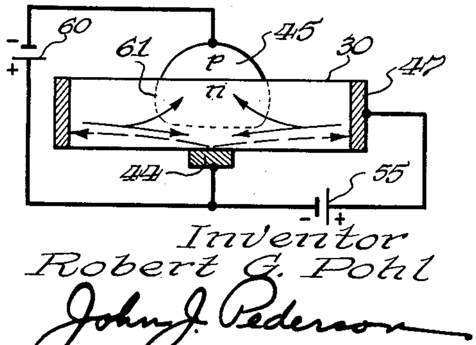

FIGURE 7 is similar to FIGURE 5 except that the potential source for biasing collector 45 in a reverse direction is in this instance connected between the collector and target 44. For pinching action to occur, it matters not what sequence of actual voltage-source connections are employed so long as collector 45 is biased in a reverse direction with respect to the other two electrodes; with this condition, a negative resistance may be obtained in the collector as above described with respect to FIGURE 5.

In order to determine the minimum size of minority-carrier reservoir 62 required to produce a negative resistance in collector 45, it is helpful to observe the following approximate relations which have been found to exist when collector 45 is back-biased sufficiently to develop a depletion region large enough to effect at least partial pinching of the base-to-target current:

$$I_b = G_o V_{bt}\left(1 + \frac{V_{ct}}{V_o}\right) \tag{1}$$

and $$I_c = -BI_b + G_c V_{ct} \tag{2}$$

where $I_b$ represents base current, $V_{bt}$ is base-to-target voltage, $V_{ct}$ is collector-to-target voltage, $V_o$ is the collector-to-target voltage at which complete pinch-off of the base-to-target current occurs, $G_o$ is the base-to-target conductance without any appreciable pinching, $I_c$ is the collector current, $G_c$ is the collector leakage conductance, and B is the ratio of base derived collector current to base current; that is, B represents the proportion of the base current collected by the collector. The term "leakage" refers to that parameter normally related to reverse saturation current and surface leakage current.

In order to get the incremental small-signal relations, Equation 1 is differentiated with the result that, for assumed grounded target operation, $$i_b = \left(G_o + G_o \frac{V_c}{V_o}\right) v_b + \left(\frac{G_o V_b}{V_o}\right) v_c \tag{3}$$

or $$i_b = g_b v_b + g_{cb} v_c \tag{4}$$

where $i_b$ is the incremental base current, $g_b$ is the incremental base conductance (the incremental conductance of the base with constant collector voltage), $v_b$ is the incremental base voltage, $g_{cb}$ is the incremental transconductance of the collector with respect to the base, and $v_c$ is the incremental collector voltage.

Similarly, Equation 2 yields the relation $$i_c = -Bi_b + g_c v_c \tag{5}$$

where $i_c$ is the incremental collector current and $g_c$ is the incremental leakage conductance of the collector.

To attain an expression for a condition of negative resistance at the collector, the base is decoupled, since the negative resistance must be due to the term containing the transconductance, so that $$v_b = 0 \tag{6}$$

Then, from Equations 4 and 6, $$i_b = g_{cb} v_c \tag{7}$$

which when substituted in Equation 5 gives the result that $$i_c = (-Bg_{cb} + g_c) v_c \tag{8}$$

From this it is evident that, for a negative resistance to occur at collector 45, $$Bg_{cb} > g_c \tag{9}$$

Since B is a function of the ratio of the minority-carrier current to the majority-carrier current and $g_{cb}$ measures the effectiveness of the pinching action, it is evident that, to have a negative resistance, there must exist at the same time sufficient pinching action and a sufficient availability of minority-carriers to overcome the effect of the conductance $g_c$. Equation 9 is easily satisfied with the present construction simply by constructing wafer 30 so that region 62, the portion of wafer 30 external of depletion region 61 under a condition of maximum pinch-off of the base-to-target current, is of a size to act as a reservoir of a sufficient number of minority-carriers. Region 62 may effectively be decreased in actual size by constructing base 47 as another diode junction instead of as an ohmic contact; when such a diode contact is forward-biased, minority carriers are injected into wafer 30.

The curves displayed in FIGURES 8 and 9 were taken from the actual device for which a detailed physical description was given above and with circuit connections as illustrated in FIGURE 7. In FIGURE 8, the abscissa represents collector-to-target voltage $V_{CT}$, while the ordinate represents base current $I_B$; each curve represents a particular value of base-to-target voltage $V_{BT}$. For either a positive or a negative potential on the base with respect to the target, the base current decreases with increasing reverse bias on the collector; FIGURE 8 thus is illustrative of the pinch-off action.

In FIGURE 9, collector-to-target voltage $V_{CT}$ is plotted on the abscissa while the ordinate represents collector current $I_C$; the curves are for different particular values of base-to-target voltage $V_{BT}$. With the target negative with respect to the base, the negative collector current decreases with increasing negative collector voltage over a substantial range of operation; this indicates the negative resistance characteristic of collector electrode 45. Beyond a certain maximum negative collector potential, the measured collector current appears to begin increasing; this is believed to represent an increase of leakage current, represented by the second term on the right-hand side of Equation 5, to a value exceeding the desired minority-carrier current into the collector.

In order to understand more clearly and to appreciate the unique characteristics of the device of the present invention regardless of the particular circuit connections employed, it may be helpful to refer to FIGURE 10 which is a qualitative triaxial graphical representation depicting completely the operating characteristics of all electrodes under conditions in which the collector is reverse-biased with respect to the other two electrodes. In FIGURE 10, the base-to-target voltage $V_{BT}$, the base-to-collector voltage $V_{BC}$, and the collector-to-target voltage $V_{CT}$ are indicated by reference to three symmetrically arranged axes bearing corresponding designations. Positive polarities of the respective voltages are indicated in the direction of the arrow in each instance, with the magnitude of each voltage being represented by the distance from the appropriate axis in the plane of the drawings. Thus, for example, all points in a given plane perpendicular to the plane of the drawing and $V_{BT}$ represent a common base-to-target voltage, with positive voltages plotted above and negative voltages below the axis. When any two of the voltages are given, the third voltage can be determined either directly from the graph or by computation, since the sum of the voltage differences around a three-terminal device must always be zero.

Currents are indicated by perpendicular displacement from the plane of the three voltage axes; constant negative current loci are indicated by broken lines and should be visualized as contours below this plane, which is the plane of the paper, while constant positive current loci are indicated by solid lines representing contours above the plane. Thus, the constant current lines are analogous to contour lines utilized to depict altitudes on a topographical map. It might be appropriate at this point to note that, in accordance with conventional nomenclature, a positive current is that which flows into a terminal of a device while a negative current flows out of the terminal.

For convenience of further reference, the six sectors formed by the three voltage axes have been numbered sequentially in a clockwise direction, with the upper left-hand section being designated No. 1.

A family of constant target current ($I_T$) contours, all of which fan outwardly to the left, are shown in broken lines in sector No. 1 and in solid lines in sector No. 6. This indicates that the current characteristic is described by a sloping surface beginning upwardly of the paper in sector 6 and slanting downwardly to include the $V_{BT}$ axis from whence it continues on downwardly beneath the paper in sector 1. Each of these lines represents a constant target current; that is, anywhere along any particular line, the current remains the same. Thus, for a given desired target current, there is only one set of interelectrode voltages which provides that current.

There is also shown in heavy lines a family of constant collector current ($I_c$) contours each representing a locus along which a constant current exists, and the different lines taken together define the surface which describes the collector current for all different possible combinations of electrode voltages. In a direction along the horizontal axis and to the left of the common origin, the second collector current line represents a greater negative current than the first.

While the description thus far has been concerned primarily with operation of the device of the present invention in sector 1, the current conditions existing in sector 6 have also been shown together with a partial plot of the current conditions existing in sectors 2 and 5. In sector 2 the constant collector current lines are solid to indicate a positive current which increases with an increase of positive collector to target voltage. A similar collector current "surface" is defined in sector 5 when the base to collector voltage increases negatively. Figure 10 does not, for the sake of clarity, include representations of other possible modes of operation, reference to which is made below, and which fall in sectors 2–5; an alternative characteristic for sector 6 of FIGURE 10 is also discussed below.

Summarizing the operating characteristics depicted in FIGURE 10, sector 1 represents the current conditions present when the base is positive with respect to the target and the collector is negative with respect to both base and target. As will be developed, the constant collector current lines in this sector display the negative resistance effect in the collector, while the constant target current lines indicate the pinching action, both of which were earlier described.

In sector 2, the collector is forward-biased with respect to the target and reverse-biased with respect to the base, whereupon the collector current is of large positive value near the $V_{CT}$ axis, as would be expected. In sectors 3 and 4, the collector is forward-biased with respect to both the base and target, while in sector 5 the situation is just the reverse of that in sector 2 and there is a large positive collector current near the $V_{BC}$ axis. In sector 6, the base is negative with respect to the target and the collector is negative with respect to both the base and the target; there may be under these conditions no substantial negative resistance effects in this form of the device because of the lack of a reservoir of minority carriers under a condition which corresponds to that discussed with respect to FIGURE 6.

The principal advantages of the present invention are obtained by operation in sector 1. However, operation in the other sectors, including sectors 2 through 5 where positive collector currents are involved (which in some cases become quite large), may also be desirable for certain circuit applications. For example, with a potential impressed between the base and target to establish a voltage gradient in wafer 30 between the base and target, collector 45 may be biased in a forward direction, as indicated in FIGURE 10*a*, to a potential substantially equal to a voltage in the wafer immediately adjacent the collector junction, this latter voltage being established by the voltage drop between base and target. In this mode of operation, the structure of the present invention possesses decided advantage over prior known devices for the reason that it is susceptible to fabrication in precisely the same manner that conventional alloy-junction transistors are made whereupon no additional manufacturing equipment is required. Also, the other advantages of the present structure, which include symmetrical current-flow patterns and consequent maximum utilization of the semiconductive material, are retained.

FIGURE 11 is a triaxial graphical representation, similar to that of FIGURE 10, and illustrates the manner in which the conventional characteristic curves of FIGURE 8 may be derived from the composite characteristic. A constant base-to-target voltage $V_{BT}$ is depicted by a line 70 representing an equipotential plane parallel to but displaced from the horizontal axis and perpendicular to the plane of the drawing. Proceeding along this line from right to left, the collector-to-target voltage increases negatively, with an accompanying decrease in negative target current; since as noted above the target current is proportional to the base current, this also represents a decreasing base current.

It is also evident from the portion of FIGURE 10 reproduced in FIGURE 12 that, as in FIGURE 9, and after proceeding beyond the immediate vicinity of axis $V_{CT}$, the collector current magnitude decreases in sector 1 with increasing negative collector-to-target voltage away from the $V_{CT}$ axis until a position near point A is reached whereupon leakage current flow predominates and the collector current magnitude again increases. The negative-slope portions of the collector current lines in sector 1 represent the negative resistance region wherein the minority carrier current flow to the collector is predominant.

A further illustration of the existence of the negative resistance region is provided by the experimental curves shown in FIGURE 13*a*, in which collector current $I_c$ is plotted as a function of target-to-collector voltage $V_{TC}$. These curves were taken with a series of constant base-to-collector voltages one value of which is indicated by line 71 in FIGURE 12. The circuit connections are as indicated in FIGURE 13, including a variable target-to-collector potential source 72, and a second potential source 73 biasing the collector negative with respect to the base at each of the several values individually producing the several different curves. Thus, as the target-to-collector voltage is increased positively from zero, when the collector current surface of FIGURE 12 first proceeds downwardly and to the left of the collector-target voltage axis, the collector current quickly goes strongly negative after which it becomes less negative over a broad negative resistance region and finally again turns, near the zero current axis in FIGURE 13*a*, and becomes increasingly more negative. Each curve of FIGURE 13*a* corresponds to the intersection of an equipotential plane such as 71 with the current surface represented by the constant current contour lines in sector 1 of FIGURE 10.

FIGURE 14 illustrates an oscillator utilizing the device of the present invention and employing a resonant element in the collector circuit so as to utilize the negative resistance illustrated in FIGURE 13*a*. In a typical circuit of this construction, a resistor 99 is connected in series with a potential source 100 between base and target, while a decoupling capacitor 101 is also connected between base and target. An inductor 102, having a parallel stray capacitance 103 indicated by dash lines in FIGURE 19, is connected in series with a blocking capacitor 104 between collector and target, and a resistor 105 is connected in series with a potential source 106 between the collector and target, with source 106 polarized to bias the collector negatively with respect to the target. Potential source 100 is polarized to bias the base positively with respect to the target. The circuit oscillates because of the negative resistance between target 44 and collector 45. In a typical circuit operated in accordance with this construction, resistor 99 is 33,000 ohms, capacitor 101 is 10 microfarads, inductor 102 is 40 millihenries, resistor 105 is 100,000 ohms, potential sources 100 and 106 are each 200 volts, and blocking capacitor 104 is 0.5 microfarad. In operation, the frequency of oscillation is approximately 200 kilocycles.

Thus far, only the negative resistance characteristics of the inventive structure with respect to collector electrode 45 have been considered. In accordance with another feature of the present invention, and a feature which is applicable not only to the present inventive structure but to any other semi-conductive device wherein the control of current between two electrodes is effected by the action of a depletion region created in response to the application of a reverse bias to a third electrode and where some portion of the device serves as a reservoir of minority carriers which are uninfluenced by the depletion region at pinch-off of the controlled current. This feature of the invention is concerned with utilization of the action of the reverse-biased control electrode, which in the disclosed device is collector electrode 45, to produce a negative resistance between the other two terminals of the device. FIGURE 15 is illustrative of one embodiment of this feature and depicts schematically a potential source 75 connected to bias target 44 negatively with respect to base 47 and a constant-current source 76 connected to bias collector 45 negatively with respect to target 44.

In operation, the collector current is, in this instance, constant; it will be remembered that each of the collector current lines $I_C$ in FIGURE 10 represent just such a constant current condition. Thus, in traveling along a constant current line in FIGURE 10, a diagram may be plotted interrelating the target-to-base voltage and the target current. This is illustrated in FIGURE 15*a* wherein target-to-base voltage is plotted along the abscissa and target current along the ordinate. With the target-to-base voltage positive, target current is also positive which indicates operation in sector 6 of FIGURE 10. Point H in FIGURES 10 and 15*a* represents zero target current. From point H to E in each of these figures, negative target current increases with increasing negative target-to-base voltage, while from points E to F the negative target-to-base voltage decreases while the target current remains substantially constant. From points F to G on both curves 10 and 15*a* the collector current again increases negatively with increasing negative target-to-base voltage.

It is evident that curve portion E to F represents a negative resistance between the base and target. Between points H and E, pinching action is taking place and most of the collector current is due to leakage, while at point E the effect of normal leakage current ceases to be prevalent and the minority carrier current flowing into the collector becomes preponderant. If leakage current is negligible in the region between points E and F, the collector current is proportional to the target current and, since the collector current is constant, the target current is also constant and appears as a horizontal line in FIGURE 15*a*. At point F, the collector is practically at the target voltage whereupon there is no longer substantial pinching action and from F to G the target current flows to the base as in a pure resistance.

Figure 16A:
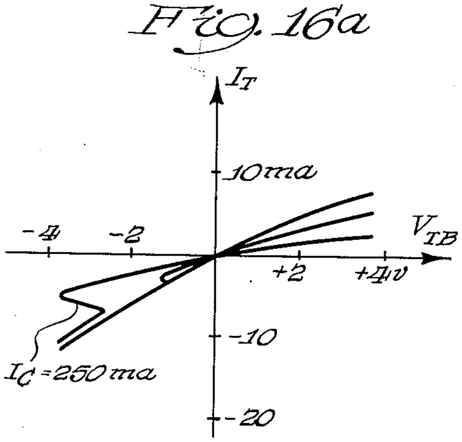
Figure 16B:
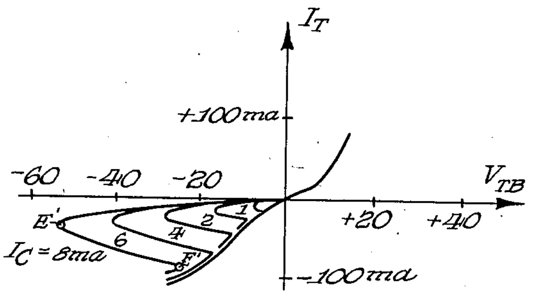

FIGURE 16 illustrates another circuit embodying the invention and demonstrating the effect displayed in FIGURE 15*a*. As in FIGURE 15, a potential source 75 biases target 44 negatively with respect to base 47. A relatively high potential source 80 is connected in series with a resistance 81 between base 47 and collector 45 to bias the latter negatively with respect to target and base; the value of resistor 81 is in this instance sufficiently high with respect to source 80 to establish for the collector essentially a constant current source. The resultant characteristics displayed in FIGURES 16*a* and 16*b* are plotted on the same axes as in FIGURE 15*a*, with FIGURE 16*a* representing operation at small values of target-to-base voltage and FIGURE 16*b* representing operation at substantially larger target-to-base voltages. In actually plotting these curves, the device used was that for which a detailed physical description was given earlier, source 80 had a constant potential of 280 volts, and the value of resistance 81 was varied to successively provide the different collector currents for which each curve was plotted; in obtaining the curve taken for a collector current of 8 milliamperes, resistance 81 was approximately 35,000 ohms. The negative resistance region in these curves, which corresponds to portions E, F of the curve in the FIGURE 15*a*, does not actually run parallel to the horizontal voltage but has a slight negative slope from E′ to F′; this lack of complete correspondence between the curves of FIGURES 15*a*, 16*a* and 16*b* is believed to be due primarily to the influence of leakage current.

It has been found that resistor 81 may be decreased in value from that which would be represented by a true constant current source while yet retaining the appearance of a negative resistance between base 47 and target 44, as evidenced by the fact that curves shaped generally like those in FIGURES 16*a* and 16*b* may be thereby obtained. Moreover, it can be shown that the minimum impedance required in series with collector 45 to effect the appearance of a negative resistance between the base and target is a function of the physical characteristics of the device itself. The condition for achieving this effect may be derived mathematically.

By application of Ohm's law, $$v_c = -Z_c i_c \tag{10}$$

where $Z_c$ is the impedance, preferably but not necessarily resistive, connected in series with collector 45, the minus sign taking into account the direction of current flow. Substituting Equation 10 in Equation 5, $$-\frac{v_c}{Z_c} = -Bi_b + g_c v_c \tag{11}$$

and solving Equation 12 for the incremental collector voltage, $$v_c = \frac{Bi_b}{\frac{1}{Z_c} + g_c} \tag{12}$$

Then, substituting Equation 12 in Equation 4, $$i_b = g_b v_b + g_{cb}\frac{Bi_b}{\frac{1}{Z_c} + g_c} \tag{13}$$

or, rearranging terms, $$i_b = \frac{g_b v_b}{1 - \frac{Bg_{cb}}{g_c + \frac{1}{Z_c}}} \tag{14}$$

From Equation 14 it can be seen that the collector impedance acts as a leakage and that the minimum series collector impedance for the appearance of a negative base-to-target resistance is specified by the relation that $$g_c + \frac{1}{Z_c} < Bg_{bc} \tag{15}$$

Therefore, resistance 81 need only be sufficiently large to satisfy relation (15) in order to have a negative resistance in a base-to-target output circuit. It should be noted that the base-to-target circuit need include only ohmic contacts of relatively low resistance to current flow in both directions.

In certain ones of a large number of devices which have been constructed as shown in FIGURE 2 and in accordance with the detailed physical description given above, a negative resistance in collector 45 has been observed with target 44 biased positively with respect to base 47. While it may be desirable for one type of circuit application to construct the device so that the volume of region 65 (FIGURE 6) between target 44 and depletion region 61 is minimized to avoid the presence of any substantial number of minority carriers and thereby produce a negative resistance with only one target-base polarity as indicated in FIGURE 10, other circuit applications may render it desirable to insure a sufficient supply of minority carriers immediately adjacent target 44 to provide a negative resistance in collector 45 regardless of target-base polarity. This dual effect has been achieved in a significant number of the devices produced as above described; it may be enhanced, for example, by effectively utilizing a larger volume of wafer material between the collector and target, as by shaping the collector junctions to cause depletion region 61' (FIGURE 17) to fan out thereby providing a larger volume of reservoir adjacent the target as indicated by region 65' in FIGURE 17, or by including some diode forming constituents of the proper polarity type in the target in order to provide for minority-carrier injection from the target.

FIGURES 17*a* and 17*b* illustrate the characteristics of such a device having a negative resistance in the collector regardless of target-base polarity. FIGURE 17*b* is a triaxial representation like that of FIGURE 10 and bearing identical nomenclature; sector 1 of FIGURE 17*b* displays constant collector current curves similar to those in sector 1 of FIGURE 10 and therefore requires no further explanation. The plots in sector 6 of FIGURE 17*b* and in FIGURE 17*a* are characteristic of the circuit of FIGURE 17 in which a voltage source 83 is connected to bias target 44 positively with respect to base 47 so as to produce majority carrier flow in the direction previously indicated in FIGURE 6 under similar conditions. There is also a potential source connected in series with an impedance 85, having a value which satisfies the condition established in relation (15), to bias collector 45 negatively with respect to base 47. The operation is illustrated in FIGURE 17*a* in which the target-to-base voltage is plotted along the abscissa and the target current is plotted along the ordinate. The family of curves displayed in this figure are similar to those shown in FIGURES 16*a* and 16*b* except that they appear in the first quadrant because of the reversed polarity of source 83 in FIGURE 17 as compared with source 75 in FIGURE 16. FIGURE 17*b* likewise illustrates the operation of the circuit shown in FIGURE 17. The constant collector current curves in sector 6 are generally symmetrical about the $V_{BT}$ axis wtih respect to sector 1; this indicates an ample minority-carrier reservoir 65' in the vicinity of target 44 as contrasted with the condition described with respect to FIGURE 6. In summary, operation as illustrated in FIGURES 17 and 17*b* appears to be achieved whenever the depletion region extends sufficiently into the base-to-target current path through wafer 30 to effect at least a partial pinch-off action while at the same time a sufficient volume of semi-conductor material is available in the immediate vicinity of the target to support minority carrier migration against the majority carrier current flow so as to produce a minority carrier current which may be drawn into the collector. Accordingly, with a structure of the type shown in FIGURES 1 and 2 or FIGURE 3 and satisfying these conditions, there is provided a device which is capable of displaying a negative resistance between the base and target regardless of the polarity of the potential applied therebetween, the device operating either as explained with respect to FIGURE 16 or as explained with respect to FIGURE 17 depending on the relative polarities of target and base. At the same time, the aforementioned advantages of symmetrical construction and facility of manufacture are retained.

FIGURES 18 and 19 are illustrative of practical circuits embodying the type of operation, in accordance with the invention, described in connection with FIGURES 15–17; while these circuits are illustrated as employing the device illustrated in FIGURES 1 and 2 and for which detailed physical characteristics were given above, it must been emphasized that other conventional semi-conductor devices such as known field-effect transistors may be substituted without departing from the invention in its present aspect. The circuit of FIGURE 18 typifies utilization of the inventive principles and may be operated either as a sawtooth oscillator or as a pulse generator. A resistor 87 is connected in series with a potential source 88 between the base and target of the device, while a condenser 89 is shunted therebetween. A resistor 90, of a magnitude satisfying Equation 15, is connected in series with a potential source 91 between the collector and target. Source 88 is polarized to bias the target negatively with respect to the base, while source 91 is polarized to bias the collector negatively with respect to the target. In operation, a recurrent sawtooth wave is observed between the base and target as one output of the circuit, while a recurrent pulse wave is observed between the collector and the target. The operation is self sustaining by reason of the negative resistance appearing between base 47 and target 44 as a result of choosing resistor 90 to satisfy Equation 15. The recurrence frequency is a function of the time-constant of resistor 87 and capacitor 89. In a typical circuit thus constructed, resistor 87 is 22,000 ohms, capacitor 89 is 0.22 microfarad, resistor 90 is 100,000 ohms, and source 88 and source 91 are each 250 volts. The recurrence rate of both output waveforms is approximately 2 kilocycles.

FIGURE 19 is a schematic diagram of a resonant oscillator circuit in which a resistor 92 is connected in series with a potential source 93 between base and target, source 93 being polarized to bias the base positively with respect to the target. A capacitor 94, an inductor 95, and a damping resistor 96 are also connected in series between the base and target. Finally, a resistor 97, selected in accordance with Equation 15, is connected in series with a voltage source 98 between the collector and target to bias the collector negative with respect to the target. In operation, the circuit oscillates, by virtue of the negative base-to-target resistance, at a frequency determined by the natural resonance frequency of reactive elements 94 and 95. Damping resistor 96 is included to limit the excursions of the oscillatory wave to values falling within the negative resistance portion of the characteristic which is like that shown in FIGURE 16*b*; without such a resistor, the resulting waveform may be seriously distorted in the higher amplitude regions. In a typical oscillator circuit so constructed, resistor 92 is 33,000 ohms, capacitor 94 is 0.15 microfarad, inductor 95 is 40 millihenries, resistor 96 is approximately 450 ohms, resistor 97 is approximately 100,000 ohms, and sources 93 and 98 are each 200 volts. The frequency of oscillation of this typical circuit was found to be approximately two kilocycles.

A device constructed in accordance with the present invention, because of its symmetrical geometry, efficiently utilizes the semi-conductor materials, while at the same time efficient control of a current flowing in a preferably purely ohmic circuit is subjected to substantially complete control by application of a potential to a single control electrode. Moreover, the inventive device so resembles in shape and appearance conventional alloyed-junction transistors that readily available manufacturing apparatus may be used in the production of the device without change and without additional apparatus. The device is also capable of being housed in a minimum of space and in the same containers which heretofore have been utilized to house conventional transistors. The device intrinsically exhibits a negative resistance in its control electrode.

Also included within the inventive concept is a semi-conductor apparatus in which a negative resistance appears between two terminals other than the control electrode, which two terminals may be ohmic in nature so as to provide a purely resistive negative-resistance circuit. This feature of the present invention also enables the utilization, to the same end, of certain prior art devices of a generally similar nature.

The device of the present invention is enhanced in its manufacture and operation by a novel base electrode structure which is also capable of finding use with ordinary transistors. This base electrode structure is advantageous in that it affords rugged mechanical support for the semi-conductive body, while at the same time insuring excellent electrical connection thereto. Another feature of the invention is an improved electrode structure which facilitates manufacture of the device and which insures an excellent electrical contact between the alloy junctions and the connecting lead members. These latter features are described and claimed in the co-pending divisional application Serial No. 126,228, filed July 24, 1961.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. Semi-conductor apparatus comprising: a body of semi-conductive material of predetermined conductivity type; means, including a region forming a diode contact with said body on a first surface portion thereof, for developing, upon the application thereto of a predetermined potential, a depletion region effectively terminating in a second body surface portion of predetermined area and opposite said first surface portion; a first electrode in ohmic contact with said body but only within said second body surface portion; a second electrode in electrical contact with said body but only within a third surface portion on said body spaced from said first and second surface portions; and means, including an impedance of predetermined magnitude coupled in series with said diode contact, for establishing a negative resistance between said first and second electrodes.

2. Semi-conductor apparatus comprising: a body of semi-conductive material having majority and minority conduction carriers therein; a first electrode in ohmic contact with said body; a second electrode in ohmic contact with said body and spaced from said first electrode to define a current path therebetween; means, including a region forming a diode contact with said body, for developing, upon the application of a predetermined potential thereto, a depletion region in a portion of said current path spaced from said second electrode; means for biasing said diode contact in a reverse direction with respect to said first and second electrodes; and an impedance coupled in series with said diode contact and having a value satisfying the relation $$g_c + 1/Z_c < Bg_{cb}$$

where, with said diode contact biased in a reverse direction with respect to said first and second electrodes, $g_c$ is the incremental leakage conductance of said diode contact, $Z_c$ is the value of said impedance, B is the ratio of second-electrode-derived diode-contact current to second-electrode current, and $g_{cb}$ is the incremental transconductance of said diode contact with respect to said second electrode, whereby a negative resistance appears between said first and second electrode.

3. Semi-conductor apparatus comprising: a body of semi-conductive material of predetermined conductivity type; a first electrode in ohmic contact with said body; means, including a region forming a diode contact with said body, for developing, upon the application of a predetermined potential thereto, a depletion region within said material; a second electrode in electrical contact with said body and disposed with respect to said first electrode to define therewith a current path an intermediate portion of which extends through said depletion region; means for biasing said diode contact in a reverse direction with respect to said first and second electrodes; and means in series with said diode contact for establishing a negative resistance between said first and second electrodes.

4. Semi-conductor apparatus comprising: a body of semi-conductive material having majority and minority carriers therein; a first electrode in ohmic contact with said body; means, including a region forming a diode contact with said body, for developing, upon the application of a predetermined potential thereto, a depletion region within said material; a second electrode in electrical contact with said body and disposed with respect to said first electrode to define therewith a current path an intermediate portion of which extends through said depletion region; a circuit, including means for biasing said second electrode with respect to said first electrode in a direction tending to establish majority-carrier current flow from said first electrode to said second electrode, coupled between said first and second electrodes; and means, comprising means including an impedance in series with said diode contact of a predetermined magnitude for establishing a negative resistance between said first and second electrodes, for biasing said diode contact in a reverse direction with respect to said first and second electrodes.

5. Semi-conductor apparatus comprising: a body of semi-conductive material having majority and minority carriers therein; a first electrode in ohmic contact with said body; means, including a region forming a diode contact with said body, for developing, upon the application of a predetermined potential thereto, a depletion region within said material; a second electrode in electrical contact with said body and disposed with respect to said first electrode to define therewith a current path an intermediate portion of which extends through said depletion region; a circuit, including means for biasing said second electrode with respect to said first electrode in a direction tending to establish majority-carrier current flow from said first electrode to said second electrode, coupled between said first and second electrodes; and means, including a constant-current source, for biasing said diode contact in a reverse direction with respect to first and second electrodes and maintaining constant the current flow in said diode contact.

6. Semi-conductor apparatus comprising: a body of semi-conductive material of predetermined conductivity type; a first electrode in ohmic contact with said body; means, including a region forming a diode contact with said body, for developing, upon the application of a predetermined potential thereto, a depletion region within said material; means, including a second electrode in electrical contact with said body and disposed with respect to said first electrode to define therewith a current path an intermediate portion of which extends through said depletion region, for establishing a condition satisfying the relation $$Bg_{cb}>g_c$$

where, with said diode contact biased in a reverse direction with respect to said first and second electrodes, B is the ratio of second-electrode-derived diode-contact current to said second-electrode current, $g_{cb}$ is the incremental transconductance of said diode contact with respect to said second electrode, and $g_c$ is the incremental leakage conductance of said diode contact; and means coupled in series with said diode contact for establishing a negative resistance between said first and second electrodes.

7. Semi-conductor apparatus comprising: a body of semi-conductive material of predetermined conductivity type; a first electrode in ohmic contact with said body; means, including a region forming a diode contact with said body, for developing, upon the application of a predetermined potential thereto, a depletion region within said material; means, including a second electrode in electrical contact with said body and disposed with respect to said first electrode to define therewith a current path an intermediate portion of which extends through said depletion region, for establishing a condition satisfying the relation $$Bg_{cb}>g_c$$

means for biasing said diode contact in a reverse direction with respect to said first and second electrodes; and an impedance coupled in series with said diode contact and having a value satisfying the relation $$g_c+1/Z_c<Bg_{cb}$$

where, with said diode contact biased in a reverse direction with respect to said first and second electrodes, $g_c$ is the incremental leakage conductance of said diode contact, $Z_c$ is the value of said impedance, B is the ratio of second-electrode-derived diode-contact current to second-electrode current, and $g_{cb}$ is the incremental transconductance of said diode contact with respect to said second electrode, whereby a negative resistance appears between said first and second electrodes.

8. Semi-conductor apparatus comprising: a body of semi-conductive material of predetermined conductivity type; a first electrode in ohmic contact with said body; means, including a region forming a diode contact with said body, for developing, upon the application of a predetermined potential thereto, a depletion region within said material; means, including a second electrode in electrical contact with said body and disposed with respect to said first electrode to define therewith a current path an intermediate portion of which extends through said depletion region, for establishing a condition satisfying the relation $$Bg_{cb}>g_c$$

where, with said diode contact biased in a reverse direction with respect to said first and second electrodes, B is the ratio of second-electrode-derived diode-contact current to second-electrode current, $g_{cb}$ is the incremental transconductance of said diode contact with respect to said second electrode, and $g_c$ is the incremental leakage conductance of said diode contact; and means, including a constant-current potential source, for biasing said diode contact in a reverse direction with respect to said first and second electrodes.

9. A semi-conductor device comprising: a base electrode comprising a generally U-shaped member including a closed end portion from which project a pair of leg portions, at least one of which is of conductive material, individually having respective first and second substantially coaxial apertures each of larger area than a predetermined area, defining a space therebetween of substantially constant predetermined width; a wafer of semi-conductive material of predetermined conductivity type, having a thickness substantially equal to said predetermined width, disposed between said legs in ohmic contact with said base electrode; a collector electrode disposed substantially coaxially within said first aperture and forming a diode contact with said wafer throughout an area equal to said predetermined area; and a target electrode disposed substantially coaxially within said second aperture in ohmic contact with said wafer but only throughout an area less than said predetermined area.

10. A semi-conductor device comprising: a wafer of semi-conductive material of predetermined conductivity type; a first electrode forming a diode junction with a predetermined surface area, on one side of said wafer, defining a zone of projection therefrom through said wafer; a second electrode in electrical contact with the side of said wafer opposite said one side but only within said zone; a third electrode in electrical contact with a surface area on said wafer but only throughout an area exclusive of said zone; means for establishing a potential difference between said second and third electrodes to create a voltage gradient in said wafer between said second and third electrodes; and means for applying to said first electrode a potential substantially equal to the voltage in said wafer immediately adjacent said diode junction.

11. A semi-conductor device comprising: a body of semi-conductive material of predetermined conductivity type; a first electrode forming a diode junction with a predetermined surface area, on one side of said body; a second electrode of a material including a modifier of the same conductivity type as that of said body, electrically joined with a surface of said body spaced from said first electrode; a third electrode in electrical contact with a surface area on said body spaced from said first and second electrodes in a location defining with the latter a current path to which a portion of the former is adjacent; means for establishing a potential difference between said second and third electrodes to create a voltage gradient in said body between said second and third electrodes; and means for applying to said first electrode a potential substantially equal to the voltage in said body immediately adjacent said diode junction.

12. A semi-conductor device comprising: a wafer of semi-conductive material of predetermined conductivity type; a first electrode forming a diode junction with a predetermined surface area, on one side of said wafer; a second electrode in electrical contact with a surface on said body and spaced from said first electrode; a third electrode in electrical contact with a surface area on said wafer effectively encircling first and second electrodes and located to define with the latter a current path to which a portion of the former is adjacent; means for establishing a potential difference between said second and third electrodes to create a voltage in said wafer between said second and third electrodes; and means for applying to said first electrode a potential substantially equal to the voltage in said wafer immediately adjacent said diode junction.

13. A semi-conductor device comprising: a body of semi-conductive material having majority and minority conduction carriers therein and to which only three electrodes are affixed, said electrodes consisting of: first electrode means, including a region forming a diode contact with said body on a first surface portion thereof, for developing, upon the application thereto of predetermined potential, a depletion region effectively terminating in a second body surface portion of predetermined area and opposite said first surface portion; a second electrode in substantially ohmic contact with said body but only within said second body surface portion; and means, including a third electrode in electrical contact with said body but only within a third surface portion on said body spaced from said first and second portions, for establishing within said device a condition satisfying the relation $$Bg_{cb} > g_c$$

where, with said diode contact biased in a reverse direction with respect to said second and third electrodes, B is the ratio of third-electrode-derived diode-contact current to third-electrode current, $g_{cb}$ is the incremental transconductance of said diode contact with respect to said third electrode, and $g_c$ is the incremental leakage conductance of said diode contact; means for reverse biasing said diode contact; and means for biasing said second and third electrodes to create, in accordance with said relation, a flow of said minority conduction carriers along a path in which the latter are susceptible to collection by said diode contact.

14. A semi-conductor device comprising: a body of semi-conductive material having majority and minority conduction carriers therein and to which only three electrodes are affixed, said electrodes consisting of: first electrode means, including a region forming a diode contact with said body on a first surface portion thereof, for developing, upon the application thereto of predetermined potential, a depletion region effectively terminating in a second body surface portion of predetermined area and opposite said first surface portion; a second electrode in substantially ohmic contact with said body but only within said second body surface portion; and means, including a third electrode in substantially ohmic contact with said body but only within a third surface portion on said body spaced from said first and second portions, for establishing within said device a condition satisfying the relation $$Bg_{cb} > g_c$$

where, with said diode contact biased in a reverse direction with respect to said second and third electrodes, B is the ratio of third-electrode-derived diode-contact current to third-electrode current, $g_{cb}$ is the incremental transconductance of said diode contact with respect to said third electrode, and $g_c$ is the incremental leakage conductance of said diode contact; means for reverse biasing said diode contact; and means for biasing said second and third electrodes to create, in accordance with said relation, a flow of said minority conduction carriers along a path in which the latter are susceptible to collection by said diode contact.

15. A semi-conductor device comprising: a body of semi-conductive material having majority and minority conduction carriers therein and to which only three electrodes are affixed, said electrodes consisting of: first electrode means, including a region forming a diode contact with said body on a first surface portion thereof, for developing, upon the application thereto of predetermined potential, a depletion region effectively terminating in a second body surface portion of predetermined area and opposite said first surface portion; and means, including a third electrode in electrical contact with said body but only within a third surface portion on said body spaced from said first and second portions, for establishing within said device a condition satisfying the relation $$Bg_{cb} > g_c$$

where, with said diode contact biased in a reverse direction with respect to said second and third electrodes, B is the ratio of third-electrode-derived diode-contact current to third-electronic current, $g_{cb}$ is the incremental transconductance of said diode contact with respect to said third electrode, and $g_c$ is the incremental leakage conductance of said diode contact; means for reverse biasing said diode contact; and means for biasing said third electrode with respect to said second electrode in accordance with said relation and with said second electrode given the polarity of said majority conduction carriers and said third electrode given the polarity of said minority conduction carriers to create a flow of said minority conduction carriers along a path in which the latter are susceptible to collection by said diode contact.

16. A semi-conductor device comprising: a body of semi-conductive material having majority and minority conduction carriers therein and to which only three electrodes are affixed, said electrodes consisting of: first electrode means, including a region forming a diode contact with said body on a first surface portion thereof, for developing, upon the application thereto of predetermined potential, a depletion region effectively terminating in a second body surface portion of predetermined area and opposite said first surface portion; a second electrode, composed primarily of a conductively neutral material but having a minor portion of a modifier capable to supplying minority conduction carriers into said body, in contact with said body but only within said second body surface portion; and means including a third electrode in electrical contact with said body but only within a third surface portion on said body spaced from said first and second portions, for establishing within said device a condition satisfying the relation $$Bg_{cb} > g_c$$

where, with said diode contact biased in a reverse direction with respect to said second and third electrodes, B is the ratio of third-electrode-derived diode-contact current to third-electrode current, $g_{cb}$ is the incremental transconductance of said diode contact with respect to said third electrode, and $g_c$ is the incremental leakage conductance of said diode contact; means for reverse biasing said diode contact; and means for biasing said second and third electrodes in accordance with said relation and with said second electrode given the polarity of said minority conduction carriers and said third electrode given the polarity of said majority conduction carriers to create a flow of said minority conduction carriers along a path in which the latter are susceptible to collection by said diode contact.

17. A semi-conductor device comprising: a wafer of semi-conductive material having majority and minority conduction carriers therein and to which only three electrodes are affixed, said electrodes consisting of: a collector electrode forming a diode junction with a predetermined surface area, on one side of said wafer, defining a zone of projection therefrom through said wafer; a target electrode in substantially ohmic contact with the side of said wafer opposite said one side but only within said zone; and means, including a base electrode in electrical contact with a surface area on said wafer but only throughout an area exclusive of said zone and spaced from said collector and target electrodes, for establishing within said device a condition satisfying the relation $$Bg_{cb}>g_c$$

where, with said collector electrode biased in a reverse direction with respect to said target and base electrodes, B is the ratio of base-electrode-derived collector electrode current to base electrode current, $g_{cb}$ is the incremental transconductance of said collector electrode with respect to said base electrode, and $g_c$ is the incremental leakage conductance of said collector electrode; means for reverse biasing said collector electrode; and means for biasing said target and base electrodes to create, in accordance with said relation, a flow of said minority conduction carriers along a path in which the latter are susceptible to collection by said collector electrode.

18. A semi-conductor device comprising: a wafer of semi-conductive material having majority and minority conduction carriers therein and to which only three electrodes are affixed, said electrodes consisting of: a collector electrode including a region forming a diode junction contact with a predetermined surface area, on one side of said wafer, defining a zone of projection therefrom through said wafer; a target electrode in substantially ohmic contact with the side of said wafer opposite said one side but only within said zone; and means, including a base electrode in electrical contact with a surface area on said wafer effectively encircling but spaced from said zone of projection, for establishing within said device a condition satisfying the relation $$Bg_{cb}>g_c$$

where, with said collector electrode biased in a reverse direction with respect to said target and base electrodes, B is the ratio of base-electrode-derived collector electrode current to base electrode current, $g_{cb}$ is the incremental transconductance of said collector electrode with respect to said base electrode, and $g_c$ is the incremental leakage conductance of said collector electrode; means for reverse biasing said collector electrode; and means for biasing said target and base electrodes to create, in accordance with said relation, a flow of said minority conduction carriers along a path in which the latter are susceptible to collection by said collector electrode.

19. A semi-conductor device comprising: a body of semi-conductive material having majority and minority conduction carriers therein and to which only three electrodes are affixed, said electrodes consisting of: first electrode means, including a region forming a diode contact with said body on a first surface portion thereof, for developing, upon the application thereto of predetermined potential, a depletion region effectively terminating in a second body surface portion of predetermined area and opposite said first surface portion; a second electrode in substantially ohmic contact with said body but only within said second body surface portion; and means, including a third electrode in electrical contact with said body but only within a third surface portion on said body spaced from and effectively encircling said first and second portions, for establishing within said device a condition satisfying the relation $$Bg_{cb}>g_c$$

where, with said diode contact biased in a reverse direction with respect to said second and third electrodes, B is the ratio of third-electrode-derived diode-contact current to third-electrode current, $g_{cb}$ is the incremental transconductance of said diode contact with respect to said third electrode, and $g_c$ is the incremental leakage conductance of said diode contact; means for reverse biasing said diode contact; means for biasing said second and third electrodes to create, in accordance with said relation, a flow of said minority conduction carriers along a path in which the latter are susceptible to collection by said diode contact; and means, including an impedance of predetermined magnitude in series with said diode contact, for establishing a negative resistance between said second and third electrodes.

References Cited in the file of this patent

UNITED STATES PATENTS

| | | |
|---|---|---|
| 2,560,579 | Kock et al. | July 17, 1951 |
| 2,634,322 | Law | Apr. 7, 1953 |
| 2,646,609 | Heins | July 28, 1953 |
| 2,681,993 | Shockley | June 22, 1954 |
| 2,691,750 | Schive | Oct. 12, 1954 |
| 2,744,219 | McCreary | May 1, 1956 |
| 2,754,431 | Johnson | July 10, 1956 |
| 2,780,752 | Aldrich et al. | Feb. 5, 1957 |
| 2,784,300 | Zuk | Mar. 5, 1957 |
| 2,794,846 | Fuller | June 4, 1957 |
| 2,801,348 | Pankove | July 30, 1957 |
| 2,805,347 | Haynes et al. | Sept. 3, 1957 |
| 2,814,735 | Cady | Nov. 26, 1957 |
| 2,825,822 | Huang | Mar. 4, 1958 |
| 2,835,615 | Leinfelder | May 20, 1958 |
| 2,842,668 | Rutz | July 8, 1958 |
| 2,907,000 | Lawrence | Sept. 29, 1959 |
| 2,907,934 | Engel | Oct. 6, 1959 |